(12) United States Patent
Varadarajan et al.

(10) Patent No.: US 12,243,296 B2
(45) Date of Patent: Mar. 4, 2025

(54) METHOD OF DETERMINING VISUAL INTERFERENCE USING A WEIGHTED COMBINATION OF CIS AND DVS MEASUREMENT

(71) Applicant: SAMSUNG ELECTRONICS CO., LTD., Suwon-si (KR)

(72) Inventors: Srenivas Varadarajan, Karnataka (IN); Anamika Sharma, Madhya Pradesh (IN); Yohan Roh, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 545 days.

(21) Appl. No.: 17/556,081

(22) Filed: Dec. 20, 2021

(65) Prior Publication Data

US 2023/0013877 A1   Jan. 19, 2023

(30) Foreign Application Priority Data

Jul. 6, 2021   (IN) .............................. 202141030334

(51) Int. Cl.
*G06V 10/80*   (2022.01)
*G06T 7/246*   (2017.01)
*G06T 7/73*   (2017.01)

(52) U.S. Cl.
CPC .............. *G06V 10/80* (2022.01); *G06T 7/246* (2017.01); *G06T 7/73* (2017.01)

(58) Field of Classification Search
CPC ...... G06V 10/80; G06V 10/449; G06V 10/46; G06V 10/806; G06V 10/14; G06V 10/75; G06V 10/764; G06T 7/246; G06T 7/73
See application file for complete search history.

(56) References Cited

U.S. PATENT DOCUMENTS 9,071,829 B2   6/2015   Michot et al.
9,378,549 B2 *   6/2016   Poole .................... G06T 7/0012
(Continued)

FOREIGN PATENT DOCUMENTS

KR   1020170110505 A   10/2017
WO   2019045722 A1   3/2019

OTHER PUBLICATIONS

J. Michot, A. Bartoli and F. Gaspard, "Bi-objective bundle adjustment with application to multi-sensor SLAM", Clermont Universite, Clermont-Ferrand, France, 2010.
(Continued)

*Primary Examiner* — Hung H Lam
(74) *Attorney, Agent, or Firm* — Fish & Richardson P.C.

(57) ABSTRACT

The embodiments herein provide a method of obtaining a weighted combination of dynamic vision sensor (DVS) measurements and contact image sensor (CIS) measurements for determining visual inference in an electronic device, the method includes receiving, by the electronic device, a DVS image and a CIS image from the image sensor; determining, by the electronic device, a plurality of parameters associated with the DVS image and feature velocities of a plurality of CIS features present in the CIS image; determining, by the electronic device, a determined DVS feature confidence based on the plurality of parameters associated with the DVS image; determining, by the electronic device, a determined CIS feature confidence based on the feature velocities of the plurality of features present in the CIS image; and calculating, by the electronic device, a weighted visual inference based on the determined DVS feature confidence and the determined CIS feature confidence.

20 Claims, 8 Drawing Sheets

(56) References Cited

U.S. PATENT DOCUMENTS

| | | | |
|---|---|---|---|
| 9,400,930 B2 | 6/2016 | Moeglein et al. | |
| 9,934,557 B2* | 4/2018 | Ji | G06T 5/50 |
| 10,109,057 B2* | 10/2018 | Benosman | H04N 25/00 |
| 11,176,424 B2* | 11/2021 | Seo | G06V 10/40 |
| 2015/0030204 A1* | 1/2015 | Lee | G06T 7/246 382/103 |
| 2019/0355169 A1 | 11/2019 | Sapienza et al. | |
| 2019/0356849 A1 | 11/2019 | Sapienza et al. | |
| 2020/0011668 A1 | 1/2020 | Derhy et al. | |
| 2021/0075964 A1 | 3/2021 | Sapienza et al. | |
| 2022/0237414 A1* | 7/2022 | Zhang | A01M 21/00 |
| 2022/0311910 A1* | 9/2022 | Zhou | G06T 7/181 |

OTHER PUBLICATIONS

A. Eudes, S. Naudet, M. Lhuillier and M. Dhome, "Weighted Local Bundle Adjustment and Application to Odometry and Visual SLAM Fusion", 2010 British Machine Vision Conference (BMVC), 1-10.

K. Cordes et al., WM-SBA Weighted multibody sparse bundle adjustment, 2015 14th IAPR International Conference on Machine Vision Applications (MVA), Tokyo, 2015, pp. 162-165,.

J. Hrabáček and F. Heuvel, "Weighted geometric object constraints integrated in a line-photogrammetric bundle adjustment", Jan. 2000 International Journal of Geo-information.

Henri Rebecq et al., High Speed and High Dynamic Range Video with an Event Camera, IEEE, 2019 10.1109TPAMI.2019.2963386.

A. Pretto et al., A visual odometry framework robust to motion blur, 2009 IEEE International Conference on Robotics and Automation, Kobe, 2009, pp. 2250-2257, doi 10.1109ROB.

Weighted bundle adjustment method in optical measurement system httpsieeexplore.ieee.orgdocument5689488.

VINS-Mono A Robust and Versatile Monocular Visual-Inertial State Estimator, Tong Qin, Peiliang Li, Shaojie Shen, IEEE Transactions on Robotics, 2017.

Online Temporal Calibration for Monocular Visual-Inertial Systems, Tong Qin, Shaojie Shen, IEEE IROS, 2018.

DAVIS dataset httprpg.ifi.uzh.chdavis_data.html.

\* cited by examiner

METHOD OF DETERMINING VISUAL INTERFERENCE USING A WEIGHTED COMBINATION OF CIS AND DVS MEASUREMENT

CROSS-REFERENCE TO RELATED APPLICATIONS

This U.S. non-provisional patent application claims priority under 35 U.S.C. § 119 to Indian Patent Application No. 202141030334, filed on Jul. 6, 2021 in the Indian Intellectual Property Office, the disclosure of which is incorporated by reference herein in its entirety.

TECHNICAL FIELD

The present disclosure relates to determination of visual inference. More particularly, the present disclosure relates to a method of determining visual inference using a weighted combination of dynamic vision sensor (DVS) and CMOS image sensor (CIS) measurements.

BACKGROUND

Computer vision (CV) methodologies infer a scene captured by a camera by taking visual measurements of features tracked in an image or a video of the scene. Visual inference refers to a process by which characteristics of a visualization (e.g., what is shown in an image or a video) are inferred based on measurements of features tracked in the visualization. The features in the image or the video are pieces of information about the content of the image; typically about whether a certain region of the image has certain properties. Features may be specific structures in the image such as points, edges or objects. Examples of features include information present in motion in image sequences, and/or information of shapes defined in terms of curves or boundaries between different image regions. Furthermore, feature tracking is the process of staying updated on the progress of feature development.

Examples of CV methodologies include simultaneous localizing and mapping (SLAM), structure from motion (SFM), visual odometry, 3D (three-dimensional) surface reconstruction, object tracking, human action recognition and human-object interaction.

In conventional methods, the visual measurements are taken from images captured by a plurality of sensors in order to overcome the deficiencies of any particular sensor. The features are tracked from the images/videos obtained from different sensors.

The different sensors from which the visual measurements are taken may include a CMOS image sensor (CIS), a dynamic vision sensor (DVS) and an inertial measurement unit (IMU). However each of these have their own advantage and disadvantage as shown in below table.

| Sensor | Pros | Cons |
| --- | --- | --- |
| CIS | Feature-rich, change-independent | Motion blur for fast scene changes; Low frame-rate |
| DVS | higher data-rate (1000 Hz), higher dynamic range of 140 dB and low-power | Noise, Variable Latency based on local contrast, change-dependent |
| IMU | Independent of lighting, image features | Accumulated Drift |

The CIS is independent of change in the camera frame and is feature-rich. However the CIS suffers motion blur for fast scene changes and has low frame rate. Further, the DVS has higher data-rate (1000 Hz), higher dynamic range of 140 dB and requires low power. However, the DVS suffers from noise and has variable latency based on local contrast of the scene and is change dependent. The IMU is independent of lighting condition, but has accumulated drift.

Because of the above mentioned disadvantages, visual measurements from different sensors are sometimes not proper. Since visual inference is determined based on the visual measurements, the resultant determined visual inference is incorrect.

Thus, there is a need for providing a method that determines proper visual inference based on visual measurement.

SUMMARY

Accordingly, the embodiments herein provide a method of obtaining weighted combination of dynamic vision sensor (DVS) measurements and contact image sensor (CIS) measurements for determining visual inference in an electronic device 100. The method includes receiving, by the electronic device, a DVS image and a CIS image from the image sensor. The method further includes determining, by the electronic device, a plurality of parameters associated with the DVS image and feature velocities of a plurality of CIS features present in the CIS image. The method further includes determining, by the electronic device, a DVS feature confidence based on the plurality of parameters associated with the DVS image. The method further includes determining, by the electronic device, a CIS feature confidence based on the feature velocities of the plurality of features present in the CIS image. The method moreover includes calculating, by the electronic device, a weighted visual inference based on the determined DVS feature confidence and the determined CIS feature confidence.

Accordingly, the embodiments herein provide the electronic device for determining the visual inference based on the weighted combination. The electronic device includes a memory a processor and a communicator, wherein the processor is configured to obtain DVS image from DVS events and to receive a CIS image from the image sensor; determine a plurality of parameters associated with the DVS image and feature velocities of a plurality of CIS features present in the CIS image; determine a DVS feature confidence based on the plurality of parameters associated with the DVS image; determine a CIS feature confidence based on the feature velocities of the plurality of features present in the CIS image; and calculate a weighted visual inference based on the determined DVS feature confidence and the determined CIS feature confidence.

These and other aspects of the embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method and network entity are illustrated in the accompanying drawings, throughout which like reference letters indicate corresponding parts in the various figures. The embodiments herein will be better understood from the following description with reference to the drawings, in which.

DETAILED DESCRIPTION

Figure 1A:
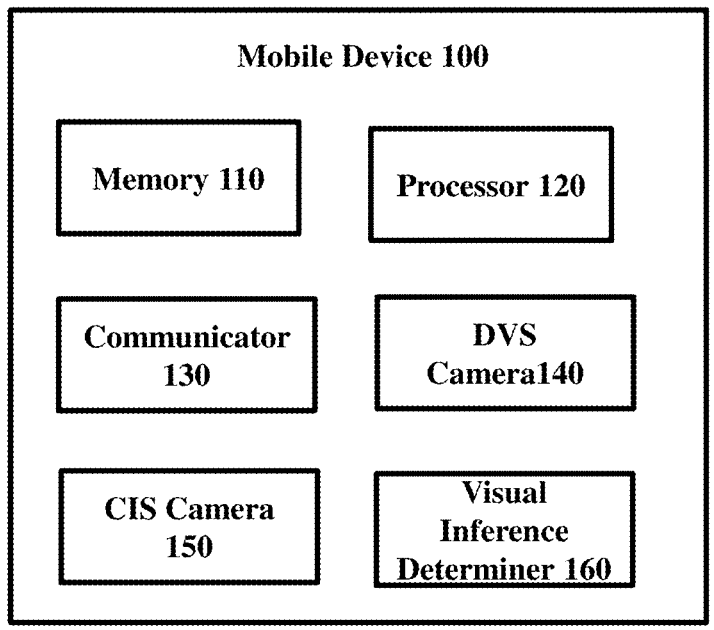
FIG. 1A illustrates a block diagram of an electronic device 100 for determining visual inference, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, may refer to non-exclusive alternatives, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components, communicators, determiners or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein provide methods of obtaining a weighted combination of dynamic vision sensor (DVS) measurements and contact image sensor (CIS) measurements for determining visual inference in an electronic device.

The methods described herein may include obtaining a weighted combination of the CIS confidence and the DVS confidence for determining the visual inference. Further for determining the DVS confidence, a number of features tracked in a DVS image may be taken into consideration.

Unlike existing methods and systems, the methods described herein may include weighing the event-camera (similar to DVS) measurements through event-image features. Since CIS and DVS are fundamentally different cameras, weighting their re-projection errors as per their uncertainties helps in a better bundle adjustment. Bundle adjustment refers to a step in a feature-based 3D reconstruction algorithm, and amounts essentially to minimizing the reprojection error between image locations of observed and predicted image points. Further the number of tracked features in frames are used as a factor for computing DVS weights. The number of long-term tracked DVS features indicate the interest points and the nature of motion in the scene. This helps in quantifying the importance of re-projection errors from DVS stream. The number of tracked features and the number of long-term tracked DVS features are relatively easy to measure but not used by earlier approaches for weighted bundle adjustment.

Further, the DVS feature confidence may be quantified as a combination of number of tracked features in frames, DVS Noise and DVS track length. A DVS sensor may be highly susceptible to noise due to the high contrast sensitivity to capture changes. But higher DVS noise leads to unreliable re-projection errors and the approach captures that. Track length captures the persistency of DVS features and hence their reliability in predicting the 3D structure of the scene.

Further, feature-level and frame-level confidences of DVS and CIS features for weighted visual inference may be combined as described herein. By moving the weights inside the summation of bundle adjustment, both frame level global confidences and feature-level confidences are captured.

Further, CIS feature confidence is quantified through motion-blur estimated from feature velocities. Unlike existing approaches that explicitly compute the motion blur, the motion blur may be predicted through feature velocities and reduces the confidence of feature points with higher velocities. The approach described herein is efficient in terms of computing.

Referring now to the drawings, and more particularly to FIG. 1A through FIG. 9, where similar reference characters denote corresponding features consistently throughout the figures, there are shown example embodiments.

FIG. 1a illustrates a block diagram of an electronic device 100 for determining visual inference, according to an embodiment as disclosed herein. The electronic device 100 may be, for example, a social robot, a smart watch, a cellular phone, a smart phone, a personal digital assistant (PDA), a tablet computer, a laptop computer, a music player, a video player, an Internet of things (IoT) device, a smart speaker, an Artificial intelligent (AI) device or the like, though the electronic device 100 is not limited to these types of devices.

In an embodiment, the electronic device 100 includes a memory 110, a processor 120, a communicator 130, a DVS camera 140, a CIS camera 150 and a visual inference determiner 160.

In an embodiment, the memory 110 is configured to store events and images clicked by the DVS camera 140 and the CIS camera 150. The memory 110 stores instructions to be executed by the processor 120. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted as indicating that the memory 110 is non-movable. In some examples, the memory 110 can be configured to store larger amounts of information than the memory. In certain examples, a non-transitory storage medium may store data that can, over time, change (e.g., in random access memory (RAM) or cache). The memory 110 can be an internal storage unit or the memory 110 can be an external storage unit of the electronic device 100, a cloud storage, or any other type of external storage.

In an embodiment, the processor 120 communicates with the memory 110, the communicator 130, the DVS camera 140, the CIS camera 150 and the visual inference determiner 160. The processor 120 is configured to execute instructions stored in the memory 110 and to perform various processes. The processor may include one or a plurality of processors, may be a general purpose processor, such as a central processing unit (CPU), an application processor (AP), or the like, a graphics-only processing unit such as a graphics processing unit (GPU), a visual processing unit (VPU), and/or an artificial intelligence (AI) dedicated processor such as a neural processing unit (NPU).

In an embodiment, the communicator 130 is configured for communicating internally between internal hardware components and with external devices via one or more networks. The communicator 130 includes an electronic circuit specific to a standard that enables wired or wireless communication. For example, the communicator 130 may includes a receiver, a transmitter, a transceiver, an encoder, a decoder, an encryptor, a decryptor, and/or other elements used for electronic communications.

In an embodiment, the DVS camera 140 is an event camera including an imaging sensor that responds to local changes in brightness of frames in preview of the DVS camera 140. The DVS camera 140 provides events present in a preview frame.

The DVS events are accumulated over a time period and are motion compensated. From these events an image representation is formed which is termed a DVS image. The DVS image is a spatio-temporal representation of the DVS events.

Thus the function of the DVS camera 140 is to obtain the DVS events for forming a single DVS image and/or a plurality of DVS images.

In another embodiment, the CIS camera 150 provides a CIS image. The CIS camera may provide a single CIS image or a plurality of CIS images.

In another embodiment, the electronic device 100, may have a single camera with DVS and CIS incorporated in it.

In an embodiment, the visual inference determiner 160 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. In some embodiments, the visual inference determiner 160 is implemented by a processor such as a microprocessor executing instructions stored in the memory 110 or in another memory. When implemented as a processor, the visual inference determiner 160 may be implemented by the processor 120 or by another processor.

In an embodiment, the visual inference determiner 160 receives the plurality DVS images obtained from the DVS events received from the DVS camera 140 and the plurality of CIS image from the CIS camera 150. The visual inference determiner 160 determines a DVS noise, a number of features tracked across the plurality of DVS images and a track length of the features tracked across the plurality of DVS images.

The DVS camera 140 is sensitive and captures at high speed moving objects. However, along with the moving objects, noise is also captured and this noise is termed as DVS noise. The DVS noise may be determined using already existing methods. The existing method(s) of DVS noise estimation are based on mean absolute deviation (MAD) or statistics such as Laplacian operator. An example method of determining DVS noise is shown in FIG. 6b, FIG. 6c and FIG. 6d for better understanding.

The number of features tracked across the plurality of DVS images represents a plurality of features which are tracked in the DVS frame/frames/image. The number of features tracked refers to a count of features tracked across the plurality of DVS image. The features are tracked in the DVS image using existing methods.

The track length of the features tracked across the plurality of DVS images represents a number of past frames across which a feature is tracked. For example, consider a scene with a table and camera which is moving from right to left, and is represented using 50 DVS frames. Consider the front left corner of the table is visible from frame 5 to 15 and after that the front left corner of the table moves out of the view. So, if currently frame 10 is going in and the table corner can be tracked across these 6 frames, then the track length of the table corner would be 6, such that the table corner is one of the features tracked across the 50 DVS frames.

The visual inference determiner 160 determines a DVS feature confidence using the DVS noise, the number of features tracked in the plurality of DVS images and the track length of the features tracked across the plurality of DVS images.

The DVS confidence is an expression of relative certainty of locations of the DVS features in the DVS image. The DVS confidence is calculated as a weighted function of the above said factors such that there is optimal tradeoff between representation and boosting of features. Equation 1 shown below is for calculation of the DVS confidence as a function of the DVS noise, the track length of the features tracked in the DVS image and the number of features tracked. In equation 1 WDVS is the DVS confidence, TL is the track length, Noise is the DVS Noise and DVS features is the number of features tracked in the plurality of DVS images.

$$W_{DVS} = 0.33 * \left(0.5 + \frac{\#DVS \text{ features}}{\text{Max } DVS \text{ features}}\right) + \\ 0.33 * \left(0.5 + \frac{TL}{\text{Max}TL}\right) + 0.33 * \left(1.5 - \left(\frac{\text{Noise} - \text{minNoise}}{\text{MaxNoise} - \text{minNoise}}\right)\right) \quad \text{Eqn. 1}$$

In an embodiment, the DVS confidence may be calculated using another equation based on requirements of one or more application(s) running on the electronic device 100.

The visual inference determiner 160 also tracks the feature(s) present in the CIS image and computes feature velocities. In an embodiment the feature velocities are determined by an already known method. The visual inference determiner 160 determines the CIS feature confidence using the feature velocities. The CIS feature confidence is calculated as a weighted function of feature velocity, such that there is optimal tradeoff between representation and boosting. The CIS feature confidence represents the certainty of locations of CIS features in the CIS image.

Once the DVS feature confidence and the CIS feature confidence are determined, the visual inference determiner 160 determines a weighted combination of the certainty of position(s) of the plurality of DVS features and the certainty of position(s) of the plurality of CIS features to obtain the weighted visual inference based on the weighted combination.

Although FIG. 1A shows various hardware components of the electronic device 100, it is to be understood that other embodiments are not limited to the teachings of FIG. 1A. In other embodiments, the electronic device 100 may include fewer or more components than are shown. Further, the labels or names of the components are used only for illustrative purpose and do not limit the scope of the teachings herein. One or more components can be combined together to perform the same or substantially similar functions to determine the weighted visual inference.

Figure 1B:
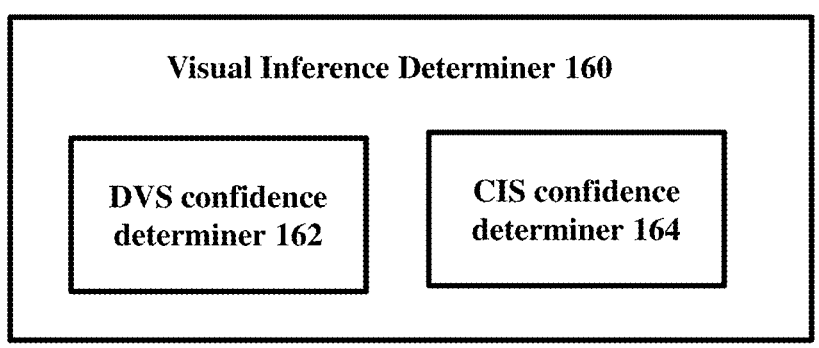
FIG. 1B illustrates a block diagram of a visual inference determiner, according to an embodiment as disclosed herein.

FIG. 1B illustrates a block diagram of the visual inference determiner 160 for determining the weighted visual inference based on the DVS feature confidence and the CIS feature confidence, according to an embodiment as disclosed herein.

In an embodiment, the visual inference determiner 160 includes a DVS confidence determiner 162, and a CIS confidence determiner 164. The DVS confidence determiner 162 and the CIS confidence determiner 164 may be implemented using separate processors such as microprocessors, or using separate cores of the same multi-core processor, or by a single processor running different software programs or sub-programs.

The DVS confidence determiner 162 computes various DVS parameters. From these parameters the DVS confidence is determined.

In an embodiment, the DVS confidence determiner 162 determines the number of features tracked in the DVS image(s). Further, the track length of the tracked feature is determined by the DVS confidence determiner 162. Further, DVS noise of the DVS image is determined by the DVS confidence determiner 162. Finally, the DVS confidence determiner 162 determines the DVS confidence by determining the certainty of location(s) of the DVS features in the DVS image based on the number of tracked features, the track length and the DVS noise.

In an embodiment, the DVS confidence determiner 162 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The CIS confidence determiner 164 computes various CIS parameters. From these parameters the CIS confidence is determined.

The CIS confidence determiner 164 tracks the features present in the CIS image using a feature detection and tracking method. Further, the CIS image-based visual measurements are obtained by the CIS confidence determiner 164. Further, the CIS confidence determiner 164 determines velocity of the CIS feature tracked in the CIS image.

Finally the CIS confidence determiner 164 determines the CIS confidence by determining the certainty of location(s) of the CIS features in the CIS image based on the computed feature velocities.

In an embodiment, the CIS confidence determiner 164 is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

The features described above may be modules/components implemented through an artificial intelligence (AI) model. A function associated with AI may be performed through the memory 110 and the processor 120. One or more processors may control the processing of the input data in accordance with a predefined operating rule or AI model stored in the non-volatile memory and the volatile memory. The predefined operating rule or artificial intelligence model is provided through training or learning.

Here, being provided through training or learning means that a predefined operating rule or AI model of a desired characteristic is made by applying a learning process to a plurality of learning data. The learning may be performed in a device itself in which AI is performed according to an embodiment, and/or may be implemented through a separate server/system.

The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a software model used by a predetermined target device (for example, a robot) with a plurality of learning data to cause, allow, or control the target device to make a determination or prediction. Examples of learning algorithms include, but are not limited to, supervised learning, unsupervised learning, semi-supervised learning, or reinforcement learning.

Although FIG. 1B shows various hardware components of the visual inference determiner 160, it is to be understood that other embodiments are not limited to the hardware components shown in FIG. 1B. In other embodiments, the visual inference determiner 160 may include fewer or more components than are shown. Further, the labels or names of the components are used only for illustrative purpose and do not limit the scope of the teachings herein. One or more components can be combined together to perform the same or substantially similar function to determine weighted visual inference.

Figure 2:
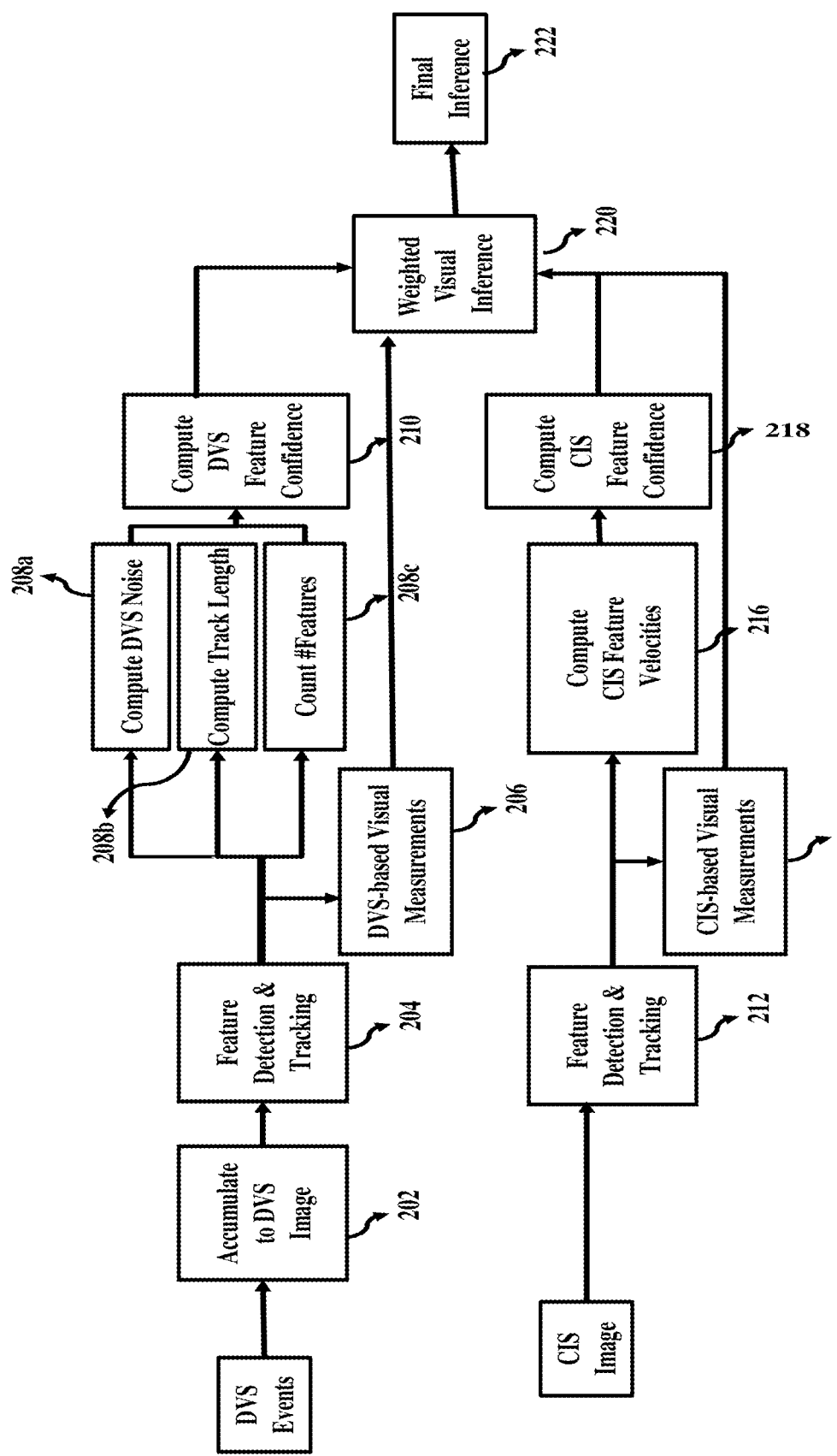
FIG. 2 is a schematic diagram for determining the visual inference using DVS feature confidence and CIS feature confidence, according to an embodiment as disclosed herein.

FIG. 2 is a schematic diagram for determining the visual inference using DVS feature confidence and CIS feature confidence, according to an embodiment as disclosed herein.

As seen in FIG. 2, the DVS events captured by the DVS camera 140 are received and the DVS image(s) is/are formed from the DVS events at 202. At 204, the features present in the DVS image are tracked using feature detection and tracking method. Known methods such as a Harris corner detector and a Kanade Lucas Tomasi tracker may be used for feature tracking and detection. At 206, the DVS image-based visual measurements are obtained. The visual measurements may be, for example, low-level or/and mid-level vision entities such as image features, object bounding boxes or human poses, though the visual measurements are not limited to these examples.

At 208c the number of features tracked in the DVS image is determined by the DVS confidence determiner 162. At 208b the track length of the tracked feature is determined by the DVS confidence determiner 162. At 208a the DVS noise of the DVS image is determined by the DVS confidence determiner 162. At 210, the DVS confidence determiner 162 determines the DVS confidence by determining the certainty of location of the DVS features in the DVS image-based on the number of tracked features, the track length and the DVS noise.

At 212, the features present in the CIS image are tracked using feature detection and tracking method. At 214, the CIS image-based visual measurements are obtained. At 216, the velocity of the CIS feature tracked in the CIS image is computed. At 218, the CIS confidence determiner 164 determines the CIS confidence by determining the certainty of location of the CIS features in the CIS image based on the computed feature velocities.

At 220, the visual inference determiner 160 determines a weighted combination of the CIS confidence and the DVS confidence and determines the weighted visual inference. At 222, a final inference is determined from the visual inference.

In the method of FIG. 2, the weights of the DVS features and CIS features are mapped to an optimal range {0.5, 1.5}. This gives an optimal tradeoff between representation and boosting when needed. Also, the method of FIG. 2 offers the possibility of combining multiple factors into a single weight.

Figure 3:
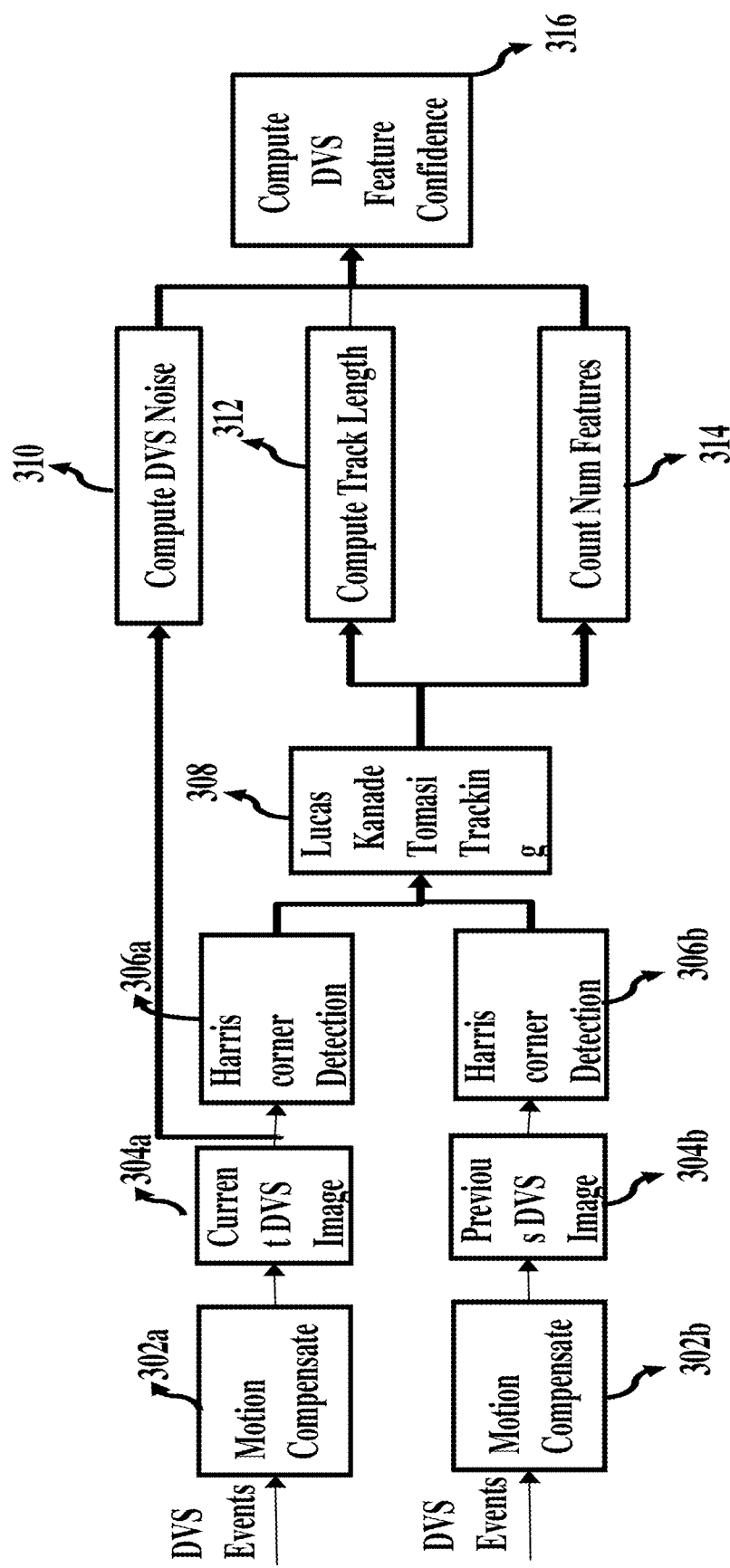
FIG. 3 is a schematic diagram illustrating determination of the DVS feature confidence by the visual inference determiner.

FIG. 3 is a schematic diagram illustrating determination of the DVS feature confidence by the visual inference determiner 160.

As seen in FIG. 3, at 302a and 302b the DVS events are received and motion compensation is performed on the received events. At 304a the DVS image is obtained from the DVS events received at 302a. The DVS image obtained at 304a is a current DVS image. At 304b the DVS image is obtained from the DVS events received at 302b. The DVS image obtained at 304b is a previous DVS image. At 306a, features of the current DVS image are determined using a Harris corner detector method. At 306b, features of the previous DVS image are determined using a Harris corner detector method. At 308, the DVS features are tracked from the current DVS image and the previous DVS image. In an embodiment, the DVS features are tracked using Lucas Kanade Tomasi tracking method. The DVS features may be tracked using any other known method.

At 310, the DVS noise of the current DVS image obtained at 304a is determined. At 312 the track length of the DVS features determined at 308 is determined and at 314 the number of features tracked at 308 is determined. The DVS camera 140 is highly susceptible to noise due to the high contrast sensitivity to capture changes. However higher DVS noise leads to unreliable re-projection errors. The method of FIG. 3 captures the noise and takes the captured noise into account while determining the DVS confidence. Further, the track length captures the persistency of the DVS features and hence the track length is of use in an application where a 3D structure of the scene is predicted. The number of long-term tracked DVS features indicate the interest points and the nature of motion in the scene. The long-term tracked DVS feature represents a feature which is tracked for a long time. For example, if a feature is being tracked in the previous ten frames, then the feature is a long-term tracked feature.

At 316, the DVS confidence is determined based on the computed DVS noise, the number of DVS features tracked and the track length of the tracked features.

Figure 4:
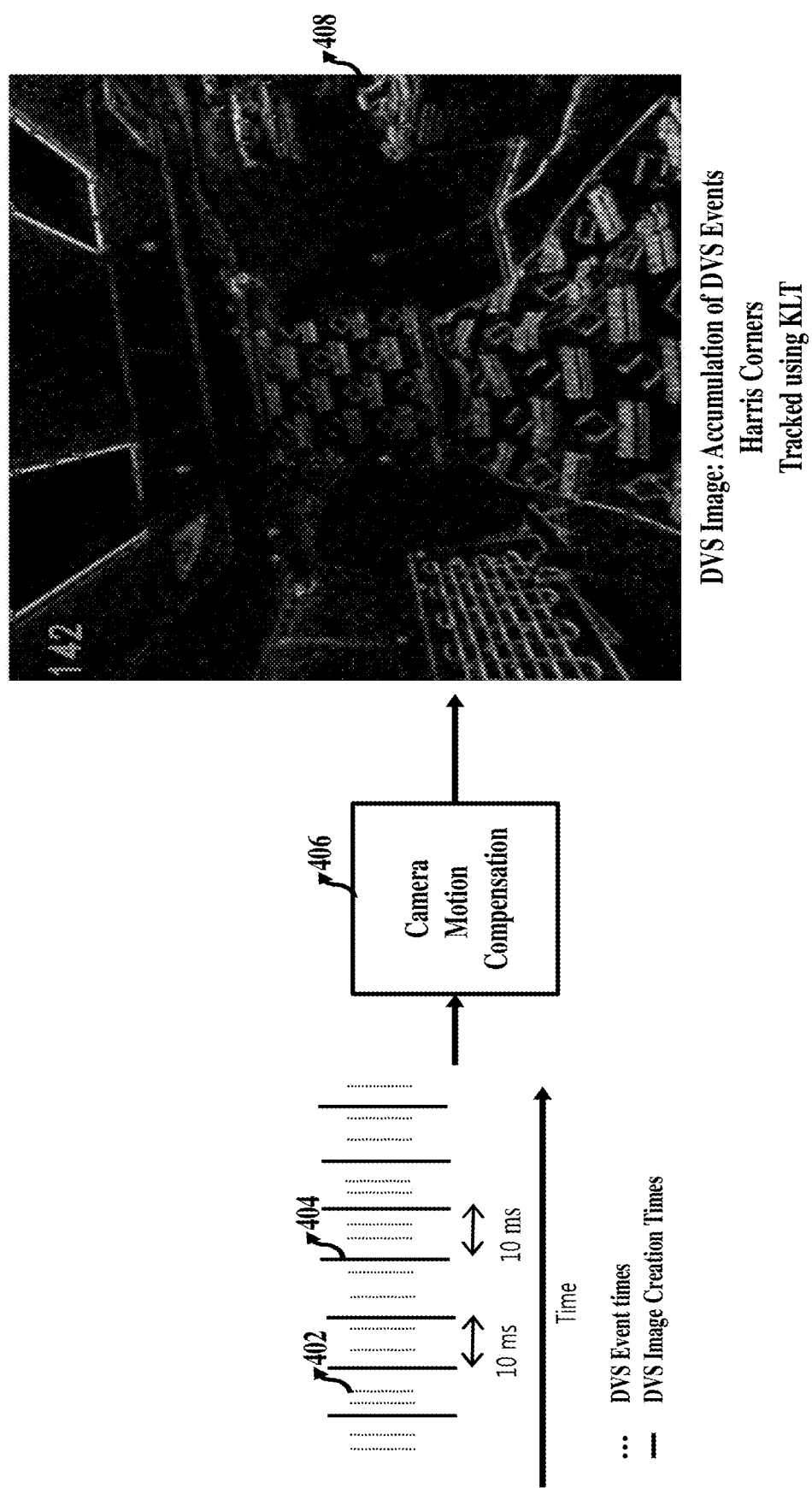
FIG. 4 is a schematic diagram illustrating accumulation of DVS events for obtaining a DVS image, according to an embodiment as disclosed herein.

FIG. 4 is a schematic diagram illustrating accumulation of DVS events for obtaining the DVS image according to an embodiment as disclosed herein.

As seen, 402 indicates the time of the DVS event and 404 indicates the time of creation of the DVS image. At 406, the DVS image is obtained using camera motion compensation. At 408, Harris corners of the DVS images are tracked using a KLT tracking method.

Figure 5:
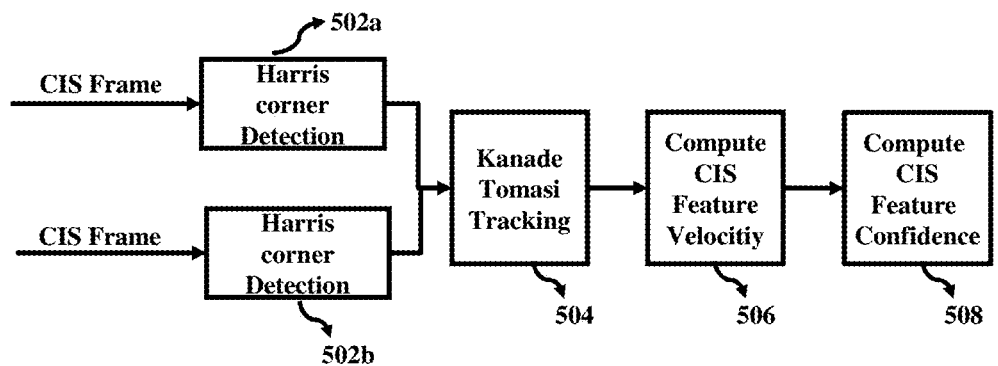
FIG. 5 is a schematic diagram illustrating determination of the CIS feature confidence by the visual inference determiner; according to an embodiment as disclosed herein.

FIG. 5 is a schematic diagram illustrating determination of the CIS feature confidence by the visual inference determiner 160.

As seen in FIG. 5, at 502a and 502b the CIS images are received and the corners of the CIS images are determined using a Harris corner detector method. In an embodiment, the CIS image at 502a is a previous CIS image and the CIS image at 502b is a current CIS image.

At 504, the CIS features are tracked from the CIS images. In an embodiment, the CIS features are tracked using a Lucas Kanade Tomasi tracking method. The CIS features may be tracked using any other known method.

At 506, the feature velocities of the CIS tracked features are determined. At 508, the CIS confidence is determined based on the computed feature velocities of the CIS features by the CIS confidence determiner 164.

FIG. 6a, FIG. 6b, FIG. 6c and FIG. 6d are schematic diagrams illustrating determination of the DVS noise in a DVS image, according to an embodiment as disclosed herein.

Figure 6A:
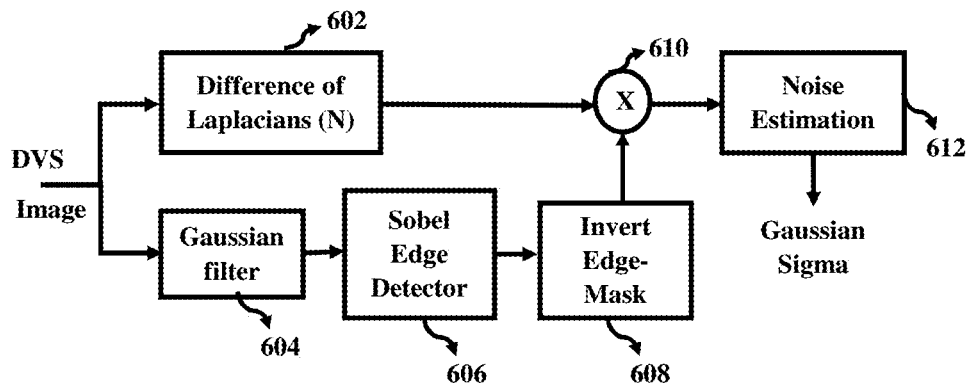
FIG. 6a, FIG. 6b, FIG. 6c and FIG. 6d are schematic diagrams illustrating determination of the DVS noise in a DVS image, according to an embodiment as disclosed herein.
Figure 6B:
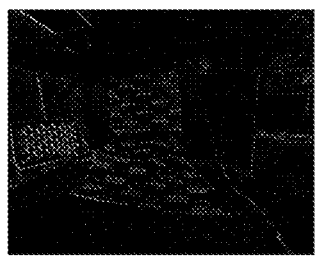
Figure 6C:
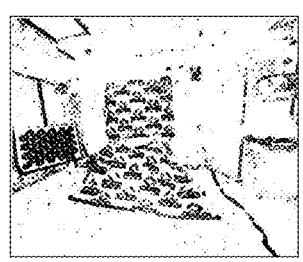
Figure 6D:
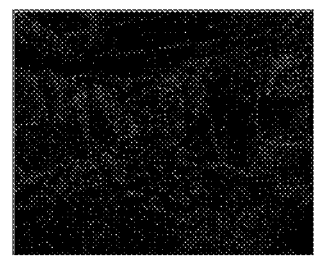

FIG. 6a is a block diagram, illustrating a method for DVS noise estimation from the DVS image. At 602, a Laplace operator is applied on the DVS image. At 604, a Gaussian filter is applied on the DVS image. 602 and 604 are two independent operations. The output of the Gaussian filter is provided as an input to a Sobel edge detector at 606. The Sobel edge detector provides an image with enhanced edges. An invert edge mask is applied on the output of the Sobel edge detector at 608. A product of the output after applying the Laplace operator at 602 and output of 608 is obtained at 610. Further, at 612 the DVS noise is determined from the image obtained at 610.

FIG. 6b illustrates a DVS image obtained from DVS events using motion compensation. FIG. 6c is an inverted Sobel edge mask which is to be applied at 608. FIG. 6d is the noise image obtained at 610 after multiplying the outputs of 602 and 608.

In other embodiments, other methods known in the art may be used for the DVS noise detection.

Figure 7:
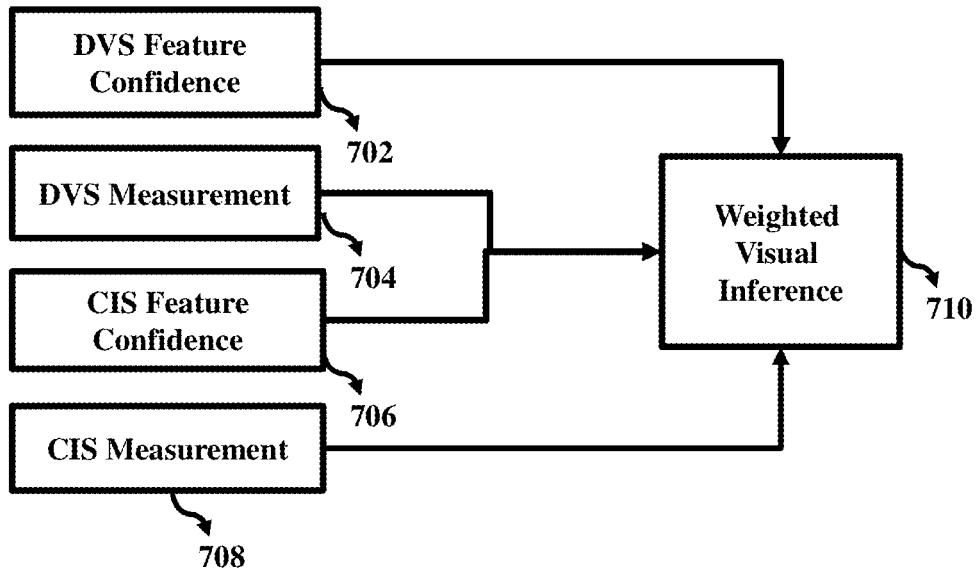
FIG. 7 is a schematic diagram illustrating determination of the weighted visual inference by the visual inference determiner 160.

FIG. 7 is a schematic diagram illustrating determination of the weighted visual inference by the visual inference determiner 160.

As seen in FIG. 7, at 702 DVS feature confidence is determined by the DVS confidence determiner 162 as explained above. At 704, the DVS visual measurements are received. At 706, the CIS feature confidence is determined by the CIS confidence determiner 164 as discussed above. At 708, the CIS visual measurements are received. Using the DVS feature confidence, the CIS feature confidence, the DVS visual measurements and the CIS visual measurements, the weighted visual inference is obtained using the visual inference determiner 160 by performing the weighted combination.

Figure 8A:
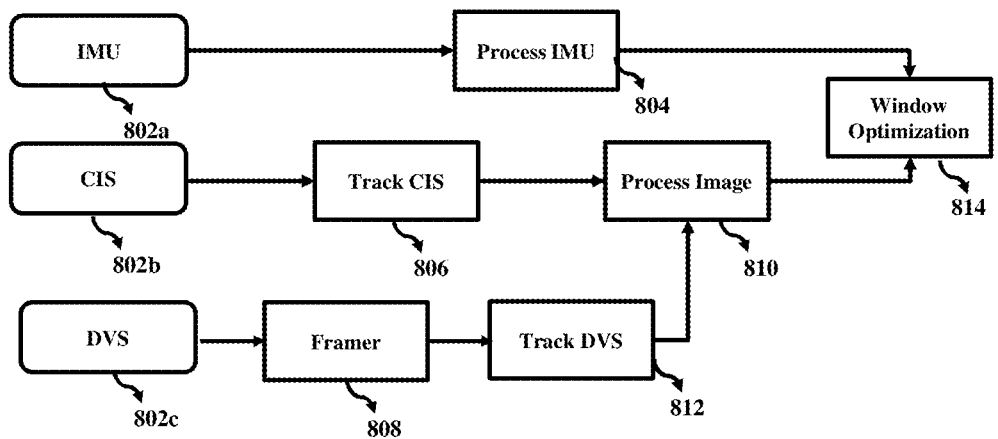
FIG. 8a and FIG. 8b are schematic diagrams illustrating an example of weighted bundle adjustment for Multimodal SLAM according to an embodiment as disclosed herein.
Figure 8B:
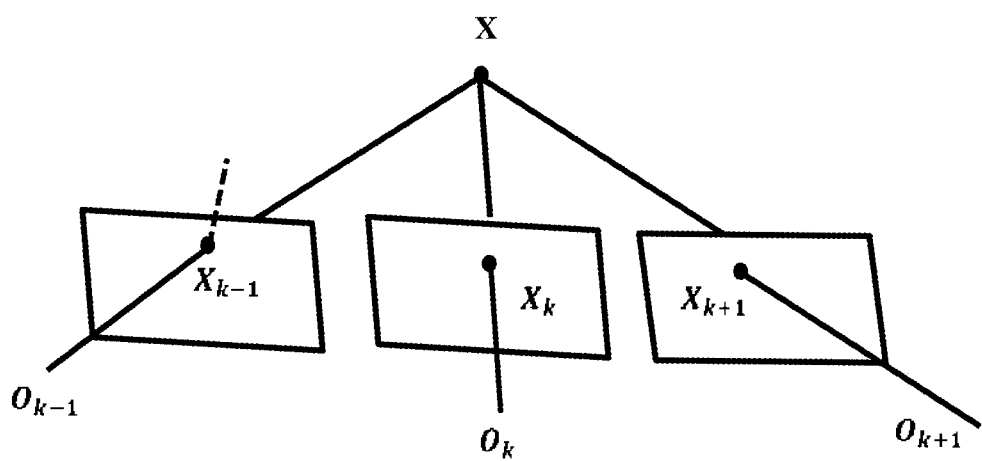

FIG. 8a and FIG. 8b are schematic diagrams illustrating an example of weighted bundle adjustment for multimodal simultaneous localization and mapping (SLAM) according to an embodiment as disclosed herein.

The multimodal SLAM is an example application where methods described herein are tested. The multimodal SLAM consists of constructing and/or updating a 3D map of an unknown environment while simultaneously keeping track of any specific location within the 3D map. In here multiple streams are used to get input data.

As seen in FIGS. 8a, 802a, 802b and 802c are three different streams which are used as input data. At 804, data from IMU is processed so that the data from IMU may be used by the multimodal SLAM application. In an embodiment, processing the data includes applying an offset and scaling the data.

At 806, features in the CIS images are detected and tracked.

At 808, the DVS events are accumulated and DVS images are formed. At 812, the DVS features present in the DVS images are detected and tracked.

At 810, the inputs from 802b and 802c are processed and long-term features are retained.

At 814, window optimization is performed wherein non-linear least squares fitting of the objective function is performed using bundle adjustment.

FIG. 8b illustrates 3D points (object points (X)) which are projected onto each camera frame to obtain 2D point (x) from respective camera centers (Ok, Ok+1, Ok−1). The rays from each 3D point are projected on to the different cameras to constitute a bundle.

In an embodiment, in bundle adjustment, the optimal camera locations and the 3D locations of features are found by simultaneously minimizing re-projection errors of the visual features across multiple cameras and the drift error of IMU.

Figure 9:
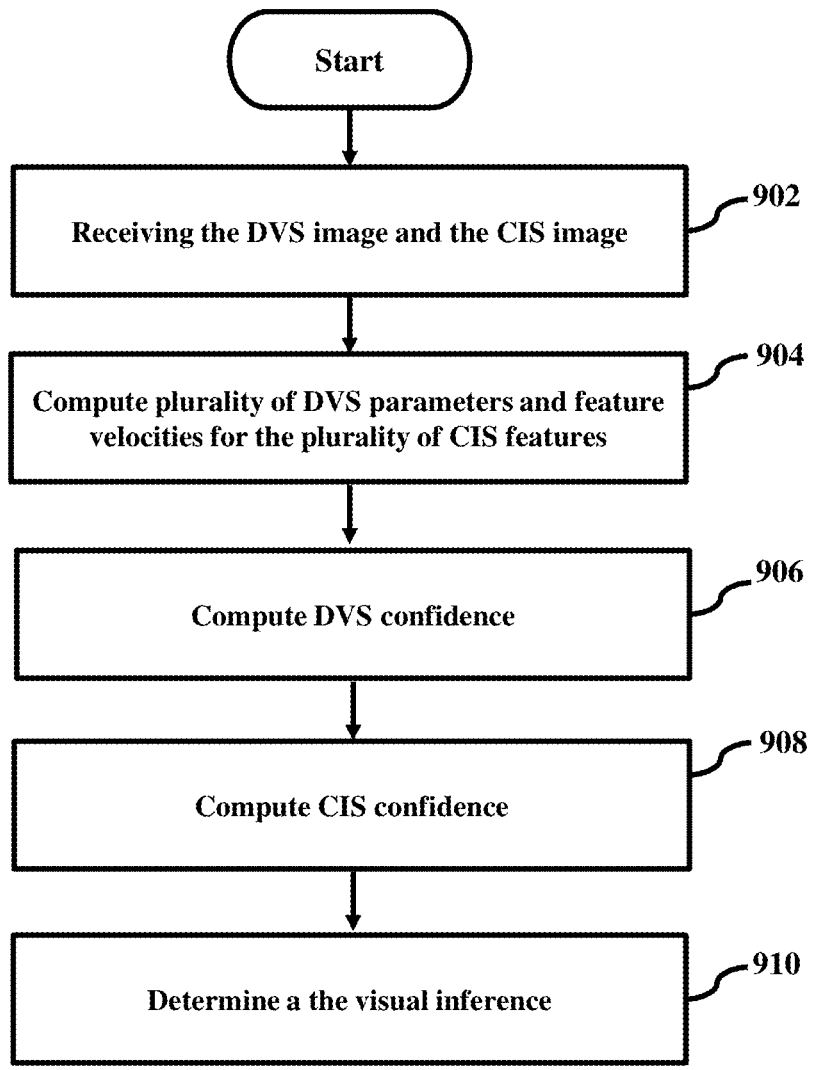
FIG. 9 is a flow diagram, illustrating the method of determining the visual inference using DVS feature confidence and CIS feature confidence, according to an embodiment as disclosed herein.

FIG. 9 is a schematic diagram illustrating a flow of determination of the visual inference, according to an embodiment as disclosed herein.

As seen in FIG. 9, at 902 the method includes receiving the DVS image and the CIS image from the image sensor of the DVS camera 140. At 904 the plurality of parameters associated with the DVS image and feature velocities of the plurality of CIS features present in the CIS image are determined. At 906, the DVS confidence is computed. At 908 the CIS confidence is computed. At 910 the visual inference is determined based on the weighted combination.

Using the teachings described herein, accuracy of visual inference may be improved, so that characteristics of a visualization (e.g., what is shown in an image or a video) are more accurately inferred based on the measurements of features tracked in the visualization. In turn, this may result in improved categorization of images, improved identification of content in images, and improved determination of contextual information relating to a visualization.

As described above, visual inference may be determined using a weighted combination of DVS measurements and contact image sensor (CIS) measurements. DVS confidence may be determined based on a number of features tracked in the DVS image. DVS confidence may be determined based on a combination of a number of tracked features in DVS image, a DVS Noise and DVS track length. CIS confidence may be determined based on feature velocities in the CIS image. The DVS and CIS confidences may be mapped to weights in an optimal range. Feature-level and frame-level confidences of DVS and CIS features may be combined for weighted visual inference. Visual inference may be determined based on the weights.

In some embodiments described herein, determining the plurality of parameters associated with the DVS image includes tracking, by the electronic device, a plurality of DVS features present in the DVS image, and determining, by the electronic device, the plurality of parameters for the plurality of DVS features present in the DVS image.

In some embodiments described herein, the plurality of parameters associated with the DVS image include a DVS noise of the DVS image, a track length of a plurality of DVS features tracked in the DVS image and a number of DVS features tracked in the DVS image.

In some embodiments described herein, determining the feature velocities of the plurality of CIS features present in the CIS image includes tracking, by the electronic device, the plurality of CIS features present in the CIS image; and determining, by the electronic device, feature velocities of the plurality of CIS features present in the CIS image.

In some embodiments described herein, determining the DVS feature confidence based on the plurality of parameters associated with the DVS image includes calculating, by the electronic device, a certainty of position of the plurality of DVS features tracked in the DVS image based on a weighted combination of at least one of the DVS noise, the track length of the plurality of DVS features tracked in the DVS image and the number of features tracked in the DVS image.

In some embodiments, determining the CIS feature confidence based on the feature velocities of the plurality of CIS features tracked in the CIS image includes estimating, by the electronic device, a motion blur for the plurality of CIS features tracked in the CIS image based on the feature velocities; and calculating, by the electronic device, a certainty of position for the plurality of CIS features tracked in the CIS image based on the estimated motion blur.

In yet other embodiments, a weighted visual inference determined by the electronic device based on the determined DVS feature confidence and the determined CIS feature confidence is determined by determining, by the electronic device, a weighted combination of the certainty of position of the plurality of DVS features and the certainty of position of the plurality of CIS features; and calculating, by the electronic device, the weighted visual inference based on the weighted combination.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the spirit and scope of the embodiments as described herein.

We claim:

1. A method of obtaining a weighted combination of dynamic vision sensor (DVS) measurements and contact image sensor (CIS) measurements for determining visual inference in an electronic device, the method comprising:
   receiving, by the electronic device, a plurality of DVS events and a CIS image from an image sensor;
   obtaining, by the electronic device, a DVS image from the plurality of DVS events;
   determining, by the electronic device, a plurality of parameters associated with the DVS image and feature velocities of a plurality of CIS features present in the CIS image;
   determining, by the electronic device, a determined DVS feature confidence based on the plurality of parameters associated with the DVS image;
   determining, by the electronic device, a determined CIS feature confidence based on the feature velocities of the plurality of CIS features present in the CIS image; and
   calculating, by the electronic device, a weighted visual inference based on the determined DVS feature confidence and the determined CIS feature confidence.

2. The method as claimed in claim 1, wherein determining the plurality of parameters associated with the DVS image comprises:
   tracking, by the electronic device, a plurality of DVS features present in the DVS image; and
   determining, by the electronic device, the plurality of parameters for the plurality of DVS features present in the DVS image.

3. The method as claimed in claim 2, wherein the plurality of parameters associated with the DVS image comprises a DVS noise of the DVS image, a track length of a plurality of DVS features tracked in the DVS image and a number of DVS features tracked in the DVS image.

4. The method as claimed in claim 1, wherein determining the feature velocities of the plurality of CIS features present in the CIS image comprises:
   tracking, by the electronic device, the plurality of CIS features present in the CIS image; and
   determining, by the electronic device, the feature velocities of the plurality of CIS features present in the CIS image.

5. The method as claimed in claim 1, wherein determining the determined DVS feature confidence based on the plurality of parameters associated with the DVS image comprises:
   calculating, by the electronic device, a certainty of position of a plurality of DVS features tracked in the DVS image based on a weighted combination of at least one of DVS noise, a track length of the plurality of DVS features tracked in the DVS image and a number of features tracked in the DVS image.

6. The method as claimed in claim 1, wherein determining the determined CIS feature confidence based on the feature velocities of the plurality of CIS features present in the CIS image comprises:
   estimating, by the electronic device, an estimated motion blur for the plurality of CIS features tracked in the CIS image based on the feature velocities; and
   calculating, by the electronic device, a certainty of position for the plurality of CIS features tracked in the CIS image based on the estimated motion blur.

7. The method as claimed in claim 1, wherein calculating, by the electronic device, the weighted visual inference based on the determined DVS feature confidence and the determined CIS feature confidence comprises:
   determining, by the electronic device, a weighted combination of a certainty of position of a plurality of DVS features and a certainty of position of the plurality of CIS features; and
   calculating, by the electronic device, the weighted visual inference based on the weighted combination.

8. An electronic device for obtaining a weighted combination of dynamic vision sensor (DVS) measurements and contact image sensor (CIS) measurements for determining visual inference, the electronic device comprising:
   a memory;
   a processor; and
   a communicator;
   wherein the processor is configured to:
      receive a plurality of DVS events and a CIS image from an image sensor;
      obtain a DVS image from the plurality of DVS events;
      determine a plurality of parameters associated with the DVS image and feature velocities of a plurality of CIS features present in the CIS image;
      determine a determined DVS feature confidence based on the plurality of parameters associated with the DVS image;
      determine a determined CIS feature confidence based on the feature velocities of the plurality of CIS features present in the CIS image; and
      calculate a weighted visual inference based on the determined DVS feature confidence and the determined CIS feature confidence.

9. The electronic device as claimed in claim 8, wherein determining the plurality of parameters associated with the DVS image comprises:
   tracking, by the electronic device, a plurality of DVS features present in the DVS image; and determining, by the electronic device, the plurality of parameters for the plurality of DVS features present in the DVS image.

10. The electronic device as claimed in claim 8, wherein the plurality of parameters associated with the DVS image comprises a DVS noise of the DVS image, a track length of a plurality of DVS features tracked in the DVS image and a number of DVS features tracked in the DVS image.

11. The electronic device as claimed in claim 8, wherein determining the feature velocities of the plurality of CIS features present in the CIS image comprises:
   tracking, by the electronic device, the plurality of CIS features present in the CIS image; and
   determining, by the electronic device, the feature velocities of the plurality of CIS features present in the CIS image.

12. The electronic device as claimed in claim 8, wherein determining the determined DVS feature confidence based on the plurality of parameters associated with the DVS image comprises:
   calculating, by the electronic device, a certainty of position of a plurality of DVS features tracked in the DVS image based on a weighted combination of at least one of DVS noise, a track length of the plurality of DVS features tracked in the DVS image and a number of features tracked in the DVS image.

13. The electronic device as claimed in claim 8, wherein determining the determined CIS feature confidence based on the feature velocities of the plurality of CIS features present in the CIS image comprises:
   estimating, by the electronic device, an estimated motion blur for the plurality of CIS features tracked in the CIS image based on the feature velocities; and
   calculating, by the electronic device, a certainty of position for the plurality of CIS features tracked in the CIS image based on the estimated motion blur.

14. The electronic device as claimed in claim 8, wherein calculating, by the electronic device, a weighted visual inference based on the determined DVS feature confidence and the determined CIS feature confidence comprises:
   determining, by the electronic device, a weighted combination of a certainty of position of a plurality of DVS features and a certainty of position of the plurality of CIS features; and
   calculating, by the electronic device, the weighted visual inference based on the weighted combination.

15. An electronic device for obtaining a weighted combination of dynamic vision sensor (DVS) measurements and contact image sensor (CIS) measurements for determining visual inference, the electronic device comprising:
   an image sensor that obtains a plurality of DVS events and a CIS image;
   a memory that stores instructions; and
   a processor that executes the instructions,
   wherein, when the instructions are executed by the processor, the electronic device is configured to:
      obtain a DVS image from the plurality of DVS events;
      determine a plurality of parameters associated with the DVS image and feature velocities of a plurality of CIS features present in the CIS image;
      determine a determined DVS feature confidence based on the plurality of parameters associated with the DVS image;
      determine a determined CIS feature confidence based on the feature velocities of the plurality of CIS features present in the CIS image; and
      calculate a weighted visual inference based on the determined DVS feature confidence and the determined CIS feature confidence.

16. The electronic device as claimed in claim 15, wherein determining the plurality of parameters associated with the DVS image comprises:
   tracking, by the electronic device, a plurality of DVS features present in the DVS image; and
   determining, by the electronic device, the plurality of parameters for the plurality of DVS features present in the DVS image.

17. The electronic device as claimed in claim 15, wherein the plurality of parameters associated with the DVS image comprises a DVS noise of the DVS image, a track length of a plurality of DVS features tracked in the DVS image and a number of DVS features tracked in the DVS image.

18. The electronic device as claimed in claim 15, wherein determining the feature velocities of the plurality of CIS features present in the CIS image comprises:
   tracking, by the electronic device, the plurality of CIS features present in the CIS image; and
   determining, by the electronic device, the feature velocities of the plurality of CIS features present in the CIS image.

19. The electronic device as claimed in claim 15, wherein determining the determined DVS feature confidence based on the plurality of parameters associated with the DVS image comprises:
   calculating, by the electronic device, a certainty of position of a plurality of DVS features tracked in the DVS image based on a weighted combination of at least one of DVS noise, a track length of the plurality of DVS features tracked in the DVS image and a number of features tracked in the DVS image.

20. The electronic device as claimed in claim 15, wherein determining the determined CIS feature confidence based on the feature velocities of the plurality of CIS features present in the CIS image comprises:
   estimating, by the electronic device, an estimated motion blur for the plurality of CIS features tracked in the CIS image based on the feature velocities; and
   calculating, by the electronic device, a certainty of position for the plurality of CIS features tracked in the CIS image based on the estimated motion blur.

* * * * *